United States Patent
Patel et al.

(10) Patent No.: US 10,623,980 B1
(45) Date of Patent: Apr. 14, 2020

(54) TRANSMISSION CONTROL PROTOCOL (TCP) BASED CONTROL OF A WIRELESS USER DEVICE

(71) Applicant: Sprint Communications Company L.P., Overland Park, KS (US)

(72) Inventors: Kashyap Narendra Patel, Overland Park, KS (US); Chidambaram Pavanasam, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 170 days.

(21) Appl. No.: 15/918,272

(22) Filed: Mar. 12, 2018

(51) Int. Cl.
| | | |
|---|---|---|
| *H04L 12/26* | (2006.01) |
| *H04W 28/02* | (2009.01) |
| *H04L 29/06* | (2006.01) |
| *H04L 12/861* | (2013.01) |
| *H04L 12/801* | (2013.01) |
| *H04W 28/06* | (2009.01) |

(52) U.S. Cl.
CPC ....... *H04W 28/0236* (2013.01); *H04L 47/193* (2013.01); *H04L 49/9005* (2013.01); *H04L 69/163* (2013.01); *H04W 28/065* (2013.01)

(58) Field of Classification Search
CPC ... H04L 47/10; H04L 5/0053; H04L 12/5602; H04L 47/27
See application file for complete search history.

(56) References Cited

U.S. PATENT DOCUMENTS

| | | | |
|---|---|---|---|
| 6,742,044 B1 * | 5/2004 | Aviani | H04L 67/1008 709/225 |
| 7,796,999 B1 * | 9/2010 | Martin | H04L 47/10 455/456.1 |
| 8,320,250 B2 | 11/2012 | Speight | |
| 8,780,858 B2 | 7/2014 | Lee et al. | |
| 9,548,936 B2 | 1/2017 | Lee et al. | |
| 9,860,024 B2 | 1/2018 | Chowdhury et al. | |
| 2012/0327779 A1 | 12/2012 | Gell et al. | |
| 2013/0013791 A1 * | 1/2013 | Kotecha | H04W 28/0231 709/227 |
| 2014/0050095 A1 | 2/2014 | Szilagyi et al. | |
| 2015/0207610 A1 | 7/2015 | Medapalli | |
| 2016/0112488 A1 | 4/2016 | Oksanen | |
| 2016/0373358 A1 * | 12/2016 | Jain | H04M 11/062 |
| 2017/0048281 A1 * | 2/2017 | Yasuma | H04L 65/80 |
| 2017/0118133 A1 * | 4/2017 | Meylan | H04L 47/624 |
| 2018/0206213 A1 * | 7/2018 | Kim | H04L 69/22 |

* cited by examiner

*Primary Examiner* — Siren Wei (57) ABSTRACT

In a wireless communication network, a Transmission Control Protocol (TCP) optimization engine receives user data. The TCP optimization engine transfers a TCP packet having the user data to wireless User Equipment (UE). The UE wirelessly receives the TCP packet using a wireless communication protocol and loads the TCP packet into a TCP buffer. The UE generates a TCP Acknowledgment (ACK) for the TCP packet that also indicates the wireless communication protocol. The UE wirelessly transfers the TCP ACK to the TCP optimization engine. The TCP optimization engine selects a new size for the TCP buffer based on the wireless communication protocol in the TCP ACK from the UE. The TCP optimization engine generates and transfers a TCP buffer instruction to the UE indicating the buffer size. The UE wirelessly receives the TCP buffer instruction and sizes the TCP buffer to the TCP buffer size.

18 Claims, 8 Drawing Sheets

TRANSMISSION CONTROL PROTOCOL (TCP) BASED CONTROL OF A WIRELESS USER DEVICE

TECHNICAL BACKGROUND

Wireless data networks serve wireless user devices with mobile data communication services like internet access, voice calling, and video calling. The wireless data networks have wireless access points that exchange data over the air with wireless user devices. Two primary wireless networking technologies are Long Term Evolution (LTE) and Institute of Electrical and Electronic Engineers 802.11 (WIFI). Many wireless user devices communicate over both LTE and WIFI networks. WIFI networks may be trusted or untrusted based on their identity and security features.

In some data networks, the wireless user devices use WIFI to communicate over the Internet with an enhanced Packet Data Gateway (ePDG) in the LTE core network. These wireless user devices communicate over the Internet through the LTE core network. LTE and WIFI are also integrated together in a protocol called LTE Local Area Network Aggregation (LWA). LWA uses WIFI for wireless transport between the wireless user device and the network. Thus, LWA looks like WIFI to the wireless user device. LWA couples the WIFI protocol and the LTE protocol in a shared Packet Data Convergence Protocol (PDCP) layer. A new technology referred to as $5^{th}$ Generation New Radio (5G NR) relies on LTE signaling but uses enhanced resource block structures for user data transfers. Many new wireless user devices will be able to communicate over WIFI, LTE, LWA, and 5G NR.

The Internet Protocol (IP) is a packet-based data protocol that comprises an IP header with addressing information and an IP payload with user data. IP routers transfer IP packets from source to destination based on the IP addressing in the IP packet headers. The Transmission Control Protocol (TCP) is used with IP to ensure IP packet delivery. TCP features sequence numbers in the transmitted TCP/IP packets that must be acknowledged by the TCP receiver or the TCP transmitter will resend the TCP/IP packet. The number of TCP/IP packets that can share a single acknowledgement is called a TCP window.

TCP optimization engines are computer systems that load balance TCP/IP traffic across multiple wireless access networks. For example, a TCP optimization engine may load balance the delivery of TCP/IP packets to wireless user devices over LTE, WIFI, LWA, and 5G NR access networks. The TCP/IP engines also perform tasks like authentication, authorization, encryption, compression, and rate shaping.

The wireless user devices have TCP/IP buffers to store the TCP/IP packets. The TCP/IP buffers are typically large for high-bandwidth user applications like virtual reality and smaller for low-bandwidth applications like messaging. The TCP optimization engines transfer instructions to the wireless user devices to control the sizes of their TCP buffers and their TCP windows. The TCP optimization engines are not directly aware of the specific wireless access technology that is used by an individual wireless user device. The TCP optimization engines are not directly aware of the specific Radio Frequency (RF) measurements that are taken by an individual wireless user device. Unfortunately, the TCP optimization engines are not enhanced for a wireless environment that includes multiple different wireless access technologies.

TECHNICAL OVERVIEW

In a wireless communication network, a Transmission Control Protocol (TCP) optimization engine receives user data. The TCP optimization engine transfers a TCP packet having the user data to wireless User Equipment (UE). The UE wirelessly receives the TCP packet using a wireless communication protocol and loads the TCP packet into a TCP buffer. The UE generates a TCP Acknowledgment (ACK) for the TCP packet that also indicates the wireless communication protocol. The UE wirelessly transfers the TCP ACK to the TCP optimization engine. The TCP optimization engine selects a new size for the TCP buffer based on the wireless communication protocol in the TCP ACK from the UE. The TCP optimization engine generates and transfers a TCP buffer instruction to the UE indicating the buffer size. The UE wirelessly receives the TCP buffer instruction and sizes the TCP buffer to the TCP buffer size.

DETAILED DESCRIPTION

Figure 1:
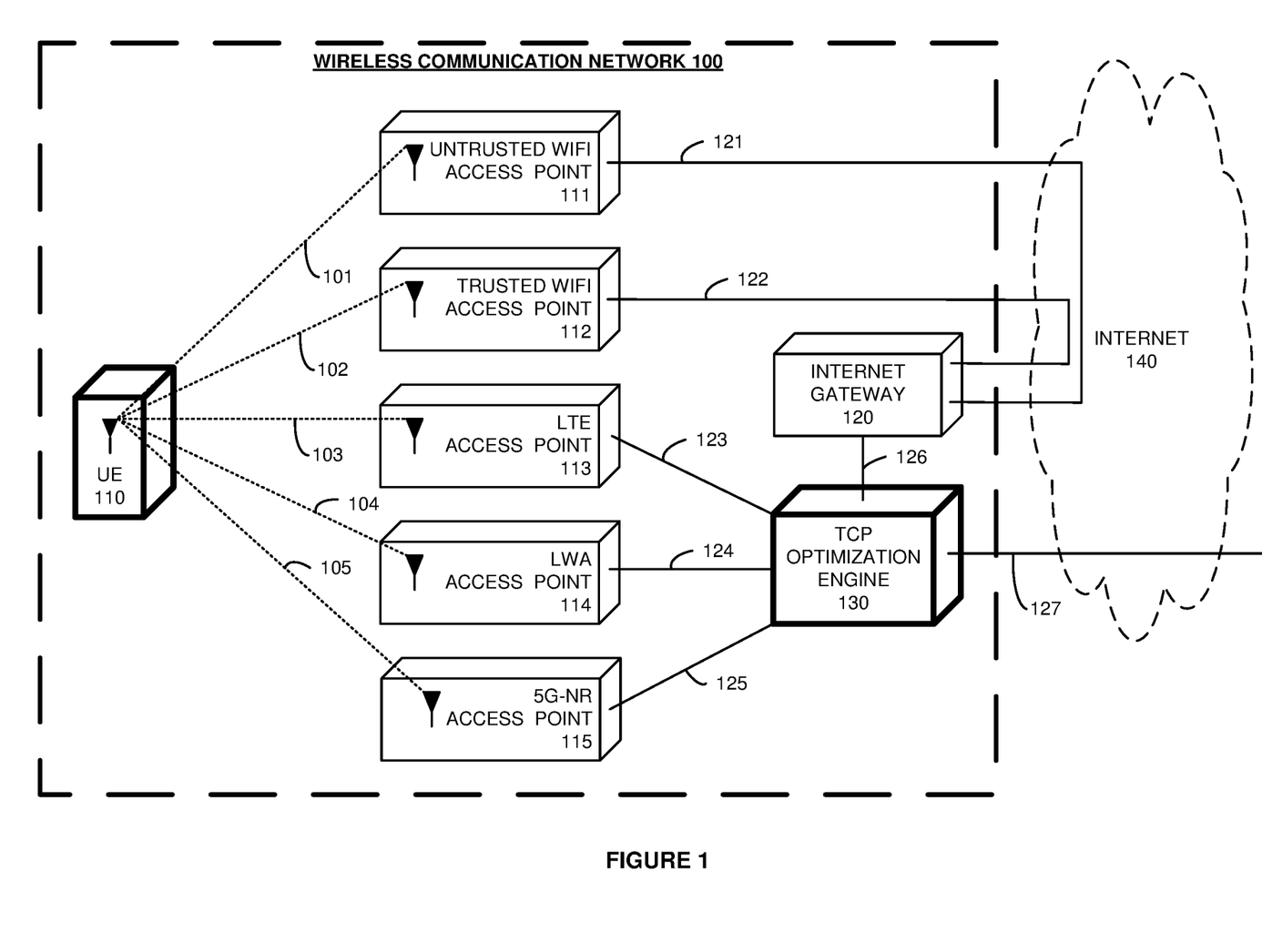
FIG. 1 illustrates a wireless communication network that uses Transmission Control Protocol (TCP) Acknowledgements (ACKs) to size a TCP buffer in User Equipment (UE) based on wireless communication protocols.

FIG. 1 illustrates wireless communication network 100 that uses Transmission Control Protocol (TCP) Acknowledgements (ACKs) to size a TCP buffer in wireless UE 110 based on wireless communication protocols. Wireless communication network 100 comprises UE 110, untrusted Institute of Electrical and Electronic Engineers 802.11 (WIFI) access point 111, trusted WIFI access point 112, Long Term Evolution (LTE) access point 113, LTE Local Area Network Aggregation (LWA) access point 114, $5^{th}$ Fifth Generation New Radio (5G NR) access point 115, internet gateway 120, and TCP optimization engine 130.

At various times, wireless UE 110 is attached to different wireless access points 111-115 over respective wireless links 101-105. For example, UE 110 may detach from untrusted WIFI access point 111 when leaving a shop and attach to LTE access point 113 for the drive home. At home, UE 110 might detach from LTE access point 113 and attach to trusted WIFI access point 112. Note that UE 110 can be simultaneously attached to multiple access points 111-115 and each user data flow through each access point would be treated as described herein for that access point's wireless access protocol.

Wireless access points 111-115 and TCP optimization engine 130 are coupled over respective data links 121-126. Note that data links 121-122 traverse internet 140 to internet gateway 120, and internet gateway 120 is coupled to TCP optimization engine 130 by data link 126. TCP optimization engine 130 is coupled to various systems (not shown) over internet 140 by representative data link 127. Data links 121-127 typically include intermediate devices that are omitted from FIG. 1 for clarity. For example, data links 121-122 typically include internet routers, and data links 123-126 typically include LTE gateways.

Wireless UE 110 could be a computer, phone, headset, graphic display, vehicle, drone, or some other wireless communication apparatus. Wireless UE 110 comprises wireless transceiver circuitry and user circuitry. The transceiver circuitry comprises antennas, modulators, amplifiers, filters, digital/analog interfaces, Digital Signal Processors (DSPs), Random Access Memory (RAM), persistent data storage, firmware/software, and bus interfaces. The transceiver circuitry uses wireless network protocols like 5G NR, LTE, LWA, and WIFI. The user circuitry comprises Central Processing Units (CPUs), Graphical Processing Units (GPUs), RAM, persistent data storage, and bus interfaces. The user circuitry includes software like operating systems and modules for Physical layer (PHY), Media Access Control (MAC), Radio Link Control (RLC), Packet Data Convergence Protocol (PDCP), Radio Resource Control (RRC), Internet Protocol (IP), Institute of Electrical and Electronic Engineers 802.3 (Ethernet), and other networking modules.

Wireless access points 111-115 comprise wireless transceiver circuitry and baseband circuitry. The transceiver circuitry comprises antennas, modulators, amplifiers, filters, digital/analog interfaces, DSPs, RAM, persistent data storage, firmware/software, and bus interfaces. The transceivers use wireless network protocols like 5G NR, LTE, LWA, and WIFI. The baseband circuitry comprises CPUs, RAM, persistent data storage, and bus interfaces. The baseband circuitry also comprises a backhaul transceiver to communicate with TCP optimization engine 130 over wireless access points 111-115. The baseband circuitry includes software like operating systems and modules for PHY, MAC, RLC, PDCP, RRC, 51, General Purpose Radio Service Transfer Protocol (GTP), IP, Ethernet, and other networking modules.

UE 110 and TCP optimization engine 130 each comprise circuitry having computer hardware and software that are configured to form special-purpose wireless communication network 100. Advantageously, wireless communication network 100 significantly improves UE 110 performance by controlling TCP buffer and window sizes based on the wireless communication protocol being used and typically based on additional RF data. The computer hardware comprises processing circuitry like CPUs, DSPs, GPUs, transceivers, bus circuitry, and memory.

To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like Control Units (CUs), Logic Units (LUs), and Random Access Memory (RAM). In turn, the CUs, LUs, and RAM are metallically connected to form CPUs, DSPs, GPUs, transceivers, bus circuitry, and memory.

In the computer hardware, the CUs drive data between the RAM and the LUs, and the LUs operate on the data. The CUs also drive interactions with external memory like flash drives, disk drives, and the like. The computer hardware executes machine-level software to control and move data by driving machine-level inputs like voltages and currents to the CUs, LUs, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware into the special-purpose UEs and TCP optimization engines described herein.

In an exemplary operation, UE 110 attaches to untrusted WIFI access point 111. WIFI access point 111 is untrusted because it is an uncontrolled public access point or does not use adequate authentication and/or encryption. UE 110 transmits a request for user data to a remote server (not shown) over untrusted WIFI access point 111, internet gateway 120, TCP optimization engine 130, and links 101, 121, 126, and 127. The remote server transfers the requested user data to UE 110 over the reciprocal data path. While the user data is in transit, TCP optimization engine 130 encapsulates the user data in TCP packets and transfers the TCP packets to UE 110 over untrusted WIFI access point 111, internet gateway 120, and links 101, 121, and 126. UE 110 receives the TCP packets and loads the TCP packets into a TCP buffer. UE 110 typically presents the user data to the user. For example, UE 110 may display a video to the user.

UE 110 generates TCP ACKs for the received TCP packets that indicate the current wireless protocol—untrusted WIFI through internet gateway 120. In some examples, internet gateway 120 comprises an enhanced High Rate Packet Data (eHRPD) gateway, and the wireless communication protocol comprises untrusted WIFI-eHRPD. UE 110 transfers the TCP ACKs to TCP optimization engine over untrusted WIFI access point 111, internet gateway 120, and links 101, 121, and 126. TCP optimization engine 130 receives the TCP ACKs and responsively selects a TCP buffer size for the TCP buffer based on the current wireless communication protocol. For example, TCP optimization engine 130 may select a small TCP buffer size for untrusted WIFI. TCP optimization engine 130 generates and transfers a TCP buffer instruction to wireless UE 110 over the reciprocal data path. UE 110 wirelessly receives the TCP buffer instruction and responsively sizes its TCP buffer to the specified TCP buffer size.

Subsequently, UE 110 detaches from untrusted WIFI access point 111 and attaches to trusted WIFI access point 112. WIFI access point 112 is trusted because it employs adequate user data encryption over wireless link 102 and data link 122. WIFI access point 112 may also be trusted because it authenticates itself through a digital certificate, an identity code hash, or some other device authentication technique.

UE 110 transmits a request for user data to a remote server (not shown) over trusted WIFI access point 112, internet gateway 120, TCP optimization engine 130, and links 102, 122, 126, and 127. The remote server transfers the requested user data to UE 110 over the reciprocal data path. While the user data is in transit, TCP optimization engine 130 encapsulates the user data in TCP packets and transfers the TCP packets to UE 110 over trusted WIFI access point 112, internet gateway 120, and links 102, 122, and 126. UE 110 receives the TCP packets and loads the TCP packets into the TCP buffer. UE 110 typically presents the user data to the user.

UE 110 generates TCP ACKs for the received TCP packets that indicate the current wireless protocol—trusted WIFI through internet gateway 120. If internet gateway 120 comprises an eHRPD gateway, then the wireless communication protocol comprises trusted WIFI-eHRPD. UE 110 transfers the TCP ACKs to TCP optimization engine 130 over trusted WIFI access point 112, internet gateway 120, and links 102, 122, and 126. TCP optimization engine 130 receives the TCP ACKs and responsively selects a new TCP buffer size for the TCP buffer based on the current wireless communication protocol. For example, the new buffer size for the trusted WIFI-eHRPD protocol may be slightly larger than the old buffer size for the untrusted WIFI-eHRPD protocol to account for the extra encryption load. TCP optimization engine 130 generates and transfers a TCP buffer instruction to wireless UE 110 over the reciprocal data path. Wireless UE 110 wirelessly receives the TCP buffer instruction and responsively re-sizes its TCP buffer to the newly specified TCP buffer size.

UE 110 then detaches from trusted WIFI access point 112 and attaches to LTE access point 113. UE 110 transmits a request for user data to a remote server (not shown) over LTE access point 113, TCP optimization engine 130, and links 103, 123, and 127. The remote server transfers the requested user data to UE 110 over the reciprocal data path. While the user data is in transit, TCP optimization engine 130 encapsulates the user data in TCP packets and transfers the TCP packets to UE 110 over LTE access point 113 and links 103 and 123. UE 110 receives the TCP packets and loads the TCP packets into the TCP buffer. UE 110 typically presents the user data to the user.

UE 110 generates TCP ACKs for the received TCP packets that indicate the current wireless protocol—LTE. UE 110 transfers the TCP ACKs to TCP optimization engine 130 over LTE access point 113 and links 103 and 123. TCP optimization engine 130 receives the TCP ACKs and responsively selects a new TCP buffer size for the TCP buffer based on the LTE protocol. For example, TCP optimization engine 130 may select a larger TCP buffer size for LTE than for WIFI to account for reduced bandwidth and reliability. TCP optimization engine 130 generates and transfers a TCP buffer instruction to wireless UE 110 over the reciprocal data path. Wireless UE 110 wirelessly receives the TCP buffer instruction and responsively re-sizes its TCP buffer to the newly specified TCP buffer size.

Subsequently, UE 110 detaches from LTE access point 113 and attaches to LWA access point 114. In some examples, access points 113-114 share the same mounting structure. UE 110 transmits a request for user data to a remote server (not shown) over LWA access point 114, TCP optimization engine 130, and links 104, 124, and 127. The remote server transfers the requested user data to UE 110 over the reciprocal data path. While the user data is in transit, TCP optimization engine 130 encapsulates the user data in TCP packets and transfers the TCP packets to UE 110 over LWA access point 114 and links 104 and 124. UE 110 receives the TCP packets and loads the TCP packets into the TCP buffer. UE 110 typically presents the user data to the user.

UE 110 generates TCP ACKs for the received TCP packets that indicate the LWA protocol. UE 110 transfers the TCP ACKs to TCP optimization engine over LWA access point 114 and links 104 and 124. TCP optimization engine 130 receives the TCP ACKs and responsively selects a new TCP buffer size for the TCP buffer based on the LWA protocol. For example, TCP optimization engine 130 may select a smaller TCP buffer size for LWA than for LTE to account for increased bandwidth. TCP optimization engine 130 generates and transfers a TCP buffer instruction to wireless UE 110 over the reciprocal data path. Wireless UE 110 wirelessly receives the TCP buffer instruction and responsively re-sizes its TCP buffer to the newly specified TCP buffer size.

Finally, UE 110 detaches from LWA access point 114 and attaches to 5G NR access point 115. In some examples, access points 113 and 115 share the same mounting structure. UE 110 transmits a request for user data to a remote server (not shown) over 5G NR access point 115, TCP optimization engine 130, and links 105, 125, and 127. The remote server transfers the requested user data to UE 110 over the reciprocal data path. While the user data is in transit, TCP optimization engine 130 encapsulates the user data in TCP packets and transfers the TCP packets to UE 110 over 5G NR access point 115 and links 105 and 125. UE 110 receives the TCP packets and loads the TCP packets into the TCP buffer. UE 110 typically presents the user data to the user.

UE 110 generates TCP ACKs for the received TCP packets that indicate the current wireless protocol—5G NR. UE 110 transfers the TCP ACKs to TCP optimization engine over 5G NR access point 115 and links 105 and 125. TCP optimization engine 130 receives the TCP ACKs and responsively selects a new TCP buffer size for the TCP buffer based on the current 5G NR protocol. For example, TCP optimization engine 130 may select a smaller TCP buffer size for 5G NR than LWA to account for the increased 5G bandwidth. TCP optimization engine 130 generates and transfers a TCP buffer instruction to wireless UE 110 over the reciprocal data path. Wireless UE 110 wirelessly receives the TCP buffer instruction and responsively re-sizes its TCP buffer to the newly specified TCP buffer size.

The TCP ACK may also indicate the RF band, wireless signal strength, data rate, and/or wireless hop count. The TCP optimization engine may then select the TCP buffer size based on the wireless communication protocol and the RF band, wireless signal strength, data rate, and/or wireless hop count. The TCP ACK may use one or more TCP options fields to indicate the current wireless communication protocol, RF band, wireless signal strength, data rate, and/or wireless hop count.

UE 110 typically processes the TCP packets with a TCP window. The TCP window indicates how many received TCP packets can share a single TCP ACK. TCP optimization engine 130 may also select TCP window sizes based on the wireless communication protocol and possibly the RF data. TCP optimization engine 130 indicates the TCP window size in the TCP instruction. Wireless UE 110 sizes its TCP window to the specified TCP window size responsive to the TCP instruction from TCP optimization engine 130.

Figure 2:
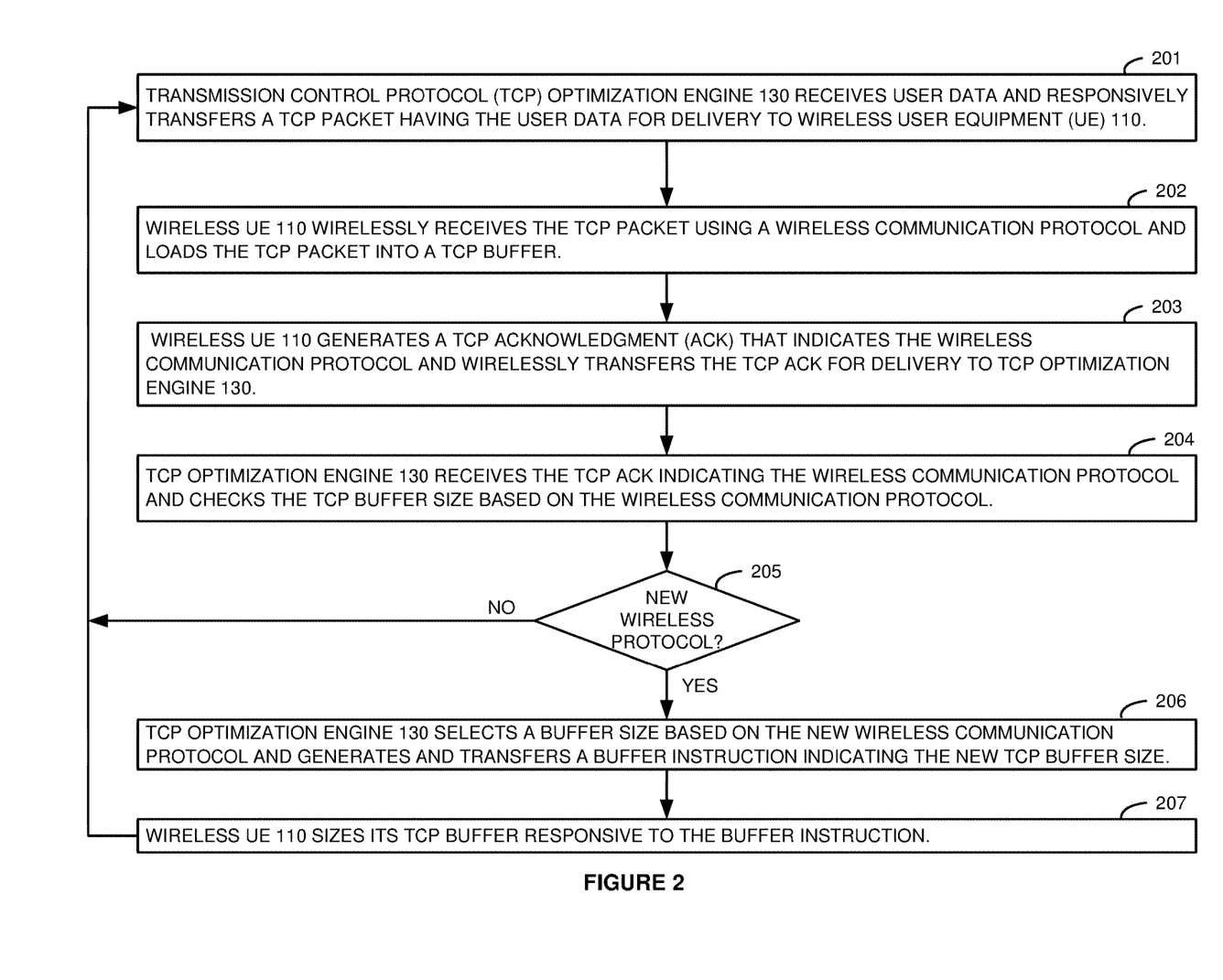
FIG. 2 illustrates the operation of the wireless communication network to use the TCP ACKs to identify the wireless communication protocols used by the wireless UE and to size the TCP buffer in the wireless UE based on the identified wireless communication protocols.

FIG. 2 illustrates the operation of wireless communication network 100 to use TCP ACKs size a TCP buffer in wireless UE 110 based on a wireless communication protocol. TCP optimization engine 130 receives user data from internet 140 for delivery to wireless UE 110. TCP optimization engine 130 encapsulates the user data in a TCP packet and transfers the TCP packet to UE 110 over one of wireless access points 111-115 (201). UE 110 receives the TCP packet and loads the TCP packet into a TCP buffer (202). Wireless UE 110 generates a TCP ACK for the received TCP packet that indicates the current wireless protocol. UE 110 transfers the TCP ACK to TCP optimization engine 130 over the serving one of access points 111-115 (203).

TCP optimization engine 130 receives the TCP ACK and checks the TCP buffer size for UE 110 based on the current wireless communication protocol and possibly other RF data (204). If a new wireless communication protocol is being used by UE 110, then TCP optimization engine 130 selects a new TCP buffer size for the TCP buffer based on the new wireless communication protocol. TCP optimization engine 130 transfers a buffer instruction to UE 110 indicating the new TCP buffer size (206). UE 110 sizes its TCP buffer to the specified TCP buffer size (207) and the operation returns to process block 201. If the same wireless communication protocol is used by UE 110 (205), then TCP optimization engine 130 does not select a new TCP buffer size and the operation returns to process block 201.

Note that a set of wireless communication protocols may use the same TCP buffer size in some cases. In these scenarios, different sets of wireless communication protocols would use different TCP buffer sizes. Thus, a new wireless communication protocol may be associated with the same TCP buffer size as the old wireless communication protocol if the wireless communication protocols are in the same set.

Figure 3:
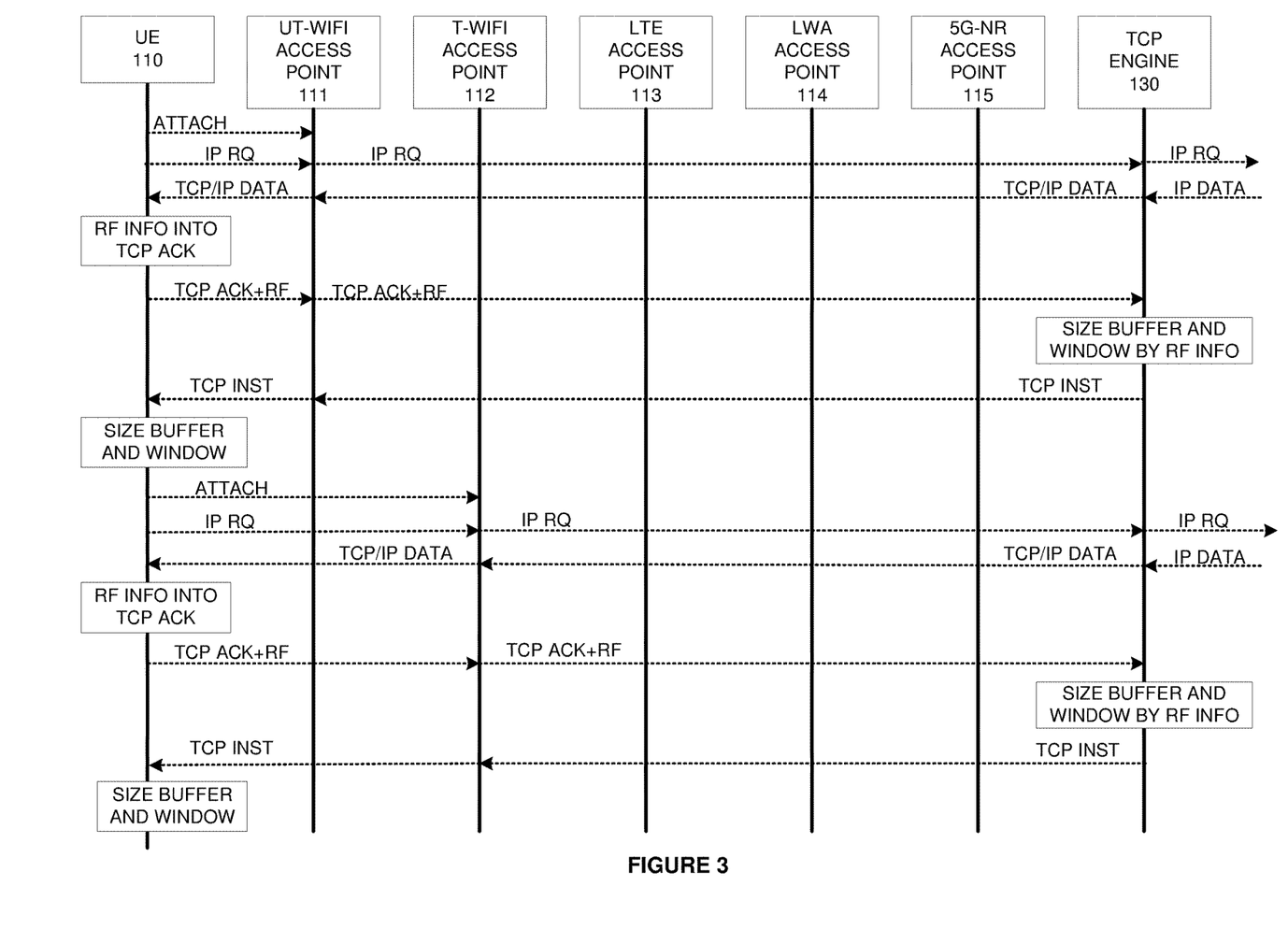
FIG. 3 illustrates the operation of the wireless communication network to use TCP ACKs to size the TCP buffer in the wireless UE based on the use of an untrusted Institute of Electrical and Electronic Engineers 802.11 (WIFI) protocol and the use of a trusted WIFI protocol.

FIG. 3 illustrates the operation of wireless communication network 100 to use a TCP ACK to size a TCP buffer and a TCP window for wireless UE 110 based on the use of Untrusted WIFI (UT-WIFI) and Trusted WIFI (T-WIFI). In this example, UT-WIFI access point 111 is not trusted because wireless communication network 100 has no trust records for UT-WIFI access point 111. T-WIFI access point 112 is trusted because trust records in TCP optimization engine 130 indicate that access point 112 employs adequate security and data encryption. In other examples, T-WIFI access point 112 may be trusted because it transfers a digital certificate to TCP optimization engine 130 that properly decrypts to indicate trust. T-WIFI access point 112 may be trusted because access point 112 transfers a hash of its internal identity code to TCP optimization engine 130 (or another server) that decrypts the hash to verify the correct identity for T-WIFI access point 112.

Initially, UE 110 attaches to UT-WIFI access point 111. UE 110 transmits an Internet Protocol Request (IP RQ) for user data over UT-WIFI access point 111 and TCP optimization engine 130. In response to the IP RQ, TCP optimization engine 130 receives IP packets having the requested user data (IP data). TCP optimization engine 130 encapsulates the IP data in TCP packets and transfers the TCP/IP data to UE 110 over UT-WIFI access point 111. UE 110 receives the TCP/IP data and loads the TCP/IP data into a TCP buffer. UE 110 generates a TCP ACK for the received TCP data that indicates RF information including the current wireless protocol of UT-WIFI. The TCP window indicates the number of TCP packets that can share the same TCP ACK. UE 110 transfers a TCP ACK per the TCP window to TCP optimization engine 130 over UT-WIFI access point 111.

TCP optimization engine 130 receives the TCP ACK and responsively selects a TCP buffer size and a TCP window size based on UT-WIFI. For example, TCP optimization engine 130 may select a small TCP buffer size and a large TCP window size for UT-WIFI. TCP optimization engine 130 generates and transfers a TCP instruction to wireless UE 110 over UT-WIFI access point 111. UE 110 wirelessly receives the TCP instruction and responsively sizes its TCP buffer to the new TCP buffer size. UE 110 also transfers TCP ACKs per the new TCP window size.

Subsequently, UE 110 detaches from UT-WIFI access point 111 and attaches to T-WIFI access point 112. UE 110 transmits an IP RQ for user data over T-WIFI access point 112 and TCP optimization engine 130. In response to the IP RQ, TCP optimization engine 130 receives the requested IP data. TCP optimization engine 130 encapsulates the IP data in TCP packets and transfers the TCP/IP data to UE 110 over T-WIFI access point 112. UE 110 receives the TCP/IP data and loads the TCP/IP data into the TCP buffer. UE 110 generates a TCP ACK for the received TCP data that indicates RF information including the current wireless protocol of T-WIFI. UE 110 transfers the TCP ACK per the TCP window to TCP optimization engine 130 over T-WIFI access point 112.

TCP optimization engine 130 receives the TCP ACK and responsively selects a TCP buffer size and a TCP window size for the TCP buffer based on the use of T-WIFI. For example, TCP optimization engine 130 may select a mid-range TCP buffer size and a mid-range TCP window size for T-WIFI. TCP optimization engine 130 generates and transfers a TCP instruction to wireless UE 110 over T-WIFI access point 112. UE 110 wirelessly receives the TCP instruction and responsively sizes its TCP buffer to the new TCP buffer size and transfers TCP ACKs per the new TCP window size.

Figure 4:
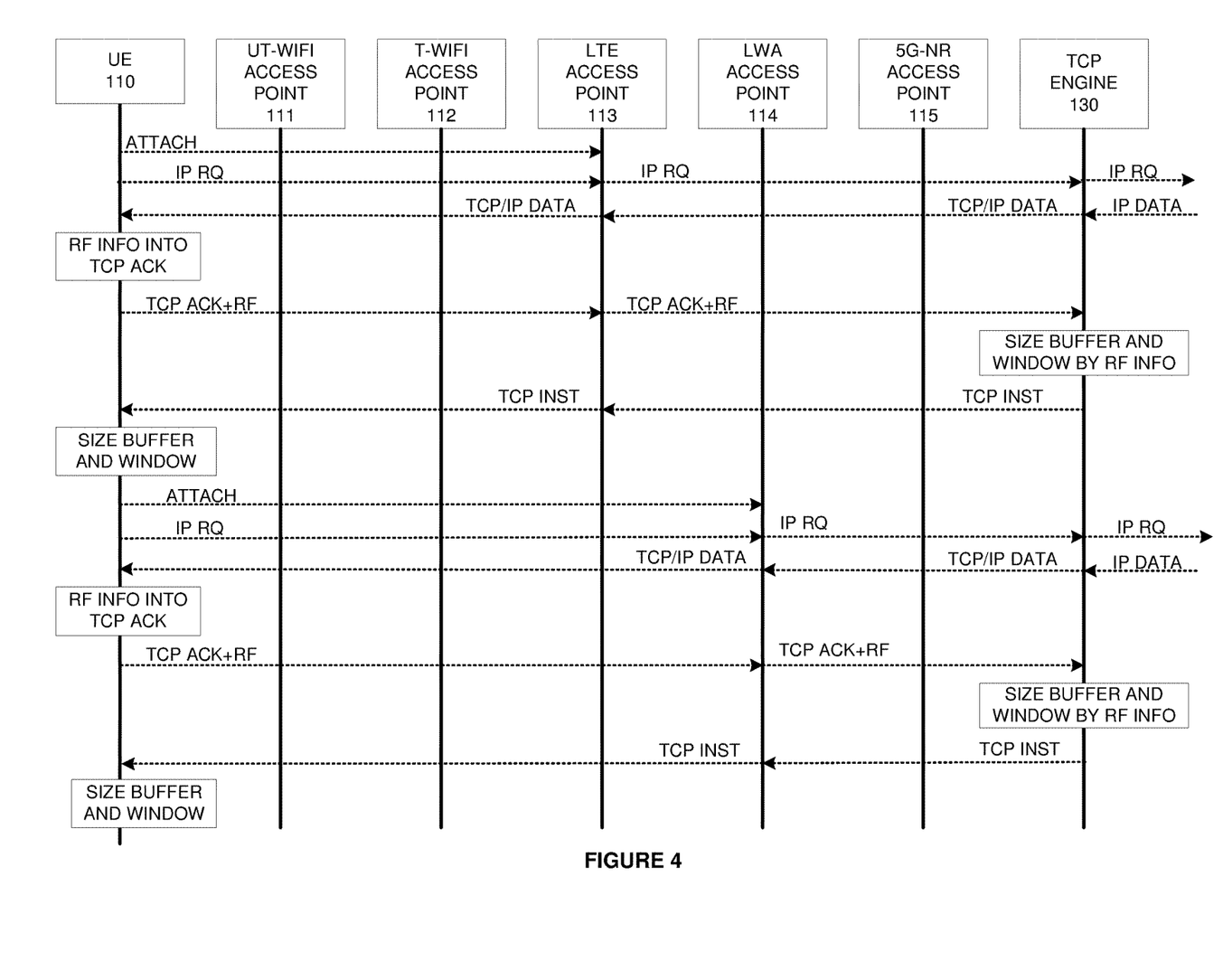
FIG. 4 illustrates the operation of the wireless communication network to use TCP ACKs to size the TCP buffer in the wireless UE based on the use of a Long Term Evolution (LTE) protocol and a LTE Local Area Network Aggregation (LWA) protocol.

FIG. 4 illustrates the operation of wireless communication network 100 to use a TCP ACK to size a TCP buffer and a TCP window for wireless UE 110 based on the use of Long Term Evolution (LTE) and LTE Local Area Network Aggregation (LWA). UE 110 attaches to LTE access point 113. UE 110 transmits an IP RQ for user data over LTE access point 113 and TCP optimization engine 130. In response to the IP RQ, TCP optimization engine 130 receives IP packets having the requested IP data. TCP optimization engine 130 encapsulates the IP data in TCP packets and transfers the TCP/IP data to UE 110 over LTE access point 113. UE 110 receives the TCP/IP data and loads the TCP/IP data into the TCP buffer. UE 110 generates a TCP ACK for the received TCP data that indicates RF information including the current wireless protocol of LTE. UE 110 transfers a TCP ACK per the TCP window to TCP optimization engine 130 over LTE access point 113.

TCP optimization engine 130 receives the TCP ACK and responsively selects a TCP buffer size and a TCP window size based on the use of LTE. For example, TCP optimization engine 130 may select a large TCP buffer size and a small TCP window size for LTE. TCP optimization engine 130 generates and transfers a TCP instruction to wireless UE 110 over LTE access point 113. UE 110 wirelessly receives the TCP instruction and responsively sizes its TCP buffer to the new TCP buffer size and transfers TCP ACKs per the new TCP window size.

Subsequently, UE 110 detaches from LTE access point 113 and attaches to LWA access point 114. UE 110 transmits an IP RQ for user data over LWA access point 114 and TCP optimization engine 130. In response to the IP RQ, TCP optimization engine 130 receives IP packets having the requested IP data. TCP optimization engine 130 encapsulates the IP data in TCP packets and transfers the TCP/IP data to UE 110 over LWA access point 114. UE 110 receives the TCP/IP data and loads the TCP/IP data into the TCP buffer. UE 110 generates a TCP ACK for the received TCP data that indicates RF information including the current wireless protocol of LWA. UE 110 transfers the TCP ACK per the TCP window to TCP optimization engine 130 over LWA access point 114.

TCP optimization engine 130 receives the TCP ACK and responsively selects a TCP buffer size and a TCP window size based on the use of LWA. For example, TCP optimization engine 130 may select a larger buffer size and a smaller window size for LWA than for LTE. TCP optimization engine 130 generates and transfers a TCP instruction to wireless UE 110 over LWA access point 114. UE 110 wirelessly receives the TCP instruction and responsively sizes its TCP buffer to the new TCP buffer size and transfers TCP ACKs per the new TCP window size.

Figure 5:
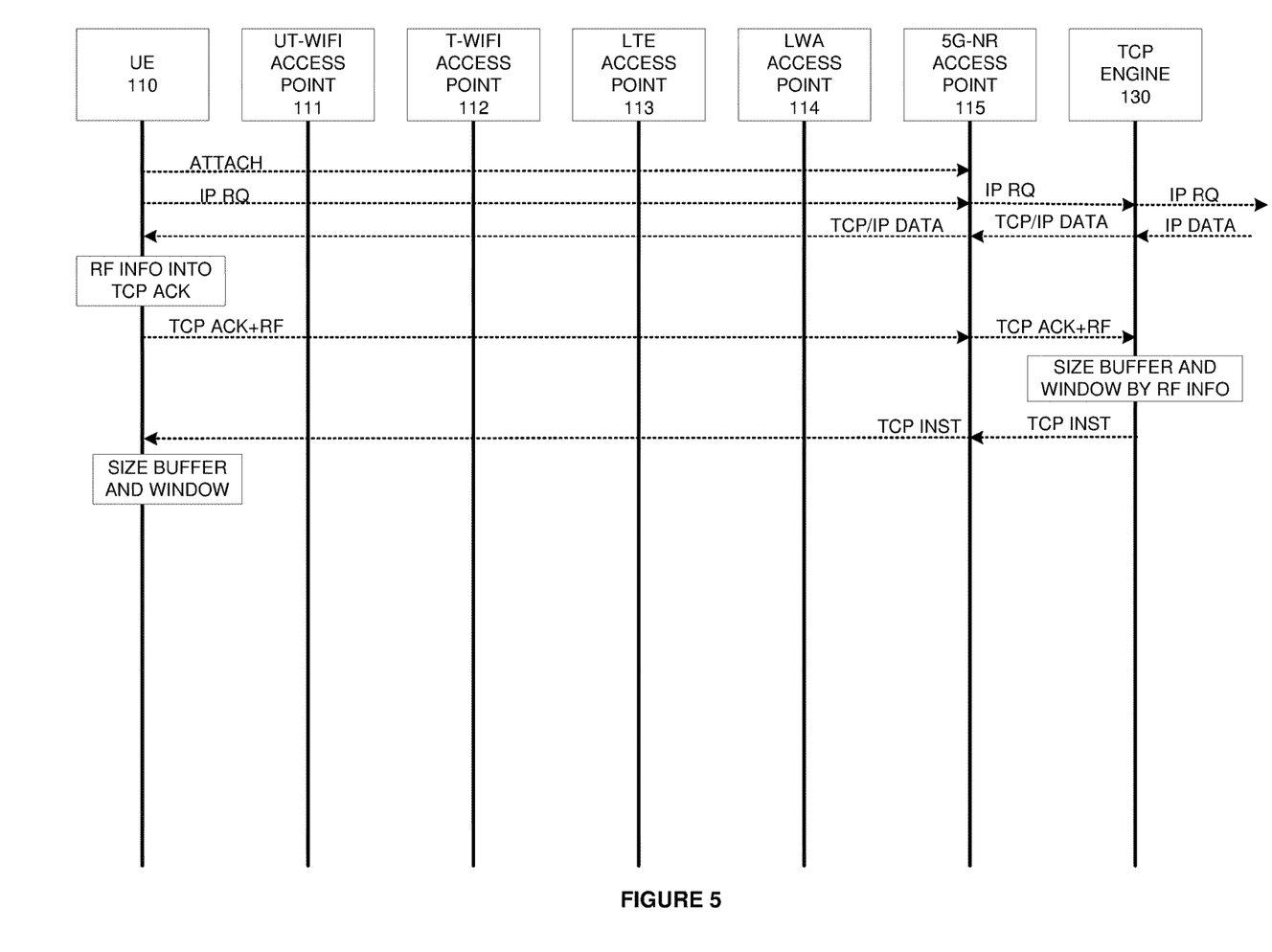
FIG. 5 illustrates the operation of the wireless communication network to use the TCP ACKs to size the TCP buffer in the wireless UE based on the use of a $5^{th}$ Generation New Radio (5G NR) protocol.

FIG. 5 illustrates the operation of wireless communication network 100 to use a TCP ACK to size a TCP buffer and a TCP window for wireless UE 110 based on the use of $5^{th}$ Generation New Radio (5G NR). UE 110 attaches to 5G NR access point 115. UE 110 transmits an IP RQ for user data over 5G NR access point 115 and TCP optimization engine 130. In response to the IP RQ, TCP optimization engine 130 receives IP packets having the requested IP data. TCP optimization engine 130 encapsulates the IP data in TCP packets and transfers the TCP/IP data to UE 110 over 5G NR access point 115. UE 110 receives the TCP/IP data and loads the TCP/IP data into the TCP buffer. UE 110 generates a TCP ACK for the received TCP data that indicates RF information including the current wireless protocol of 5G NR. UE 110 transfers a TCP ACK per the TCP window to TCP optimization engine 130 over 5G NR access point 115.

TCP optimization engine 130 receives the TCP ACK and responsively selects a TCP buffer size and a TCP window size based on the use of 5G NR. For example, TCP optimization engine 130 may select a very large TCP buffer size and a very small TCP window size for 5G NR. TCP optimization engine 130 generates and transfers a TCP instruction to wireless UE 110 over 5G NR access point 115. UE 110 wirelessly receives the TCP instruction and responsively sizes its TCP buffer to the new TCP buffer size and transfers TCP ACKs per the new TCP window size.

Figure 6:
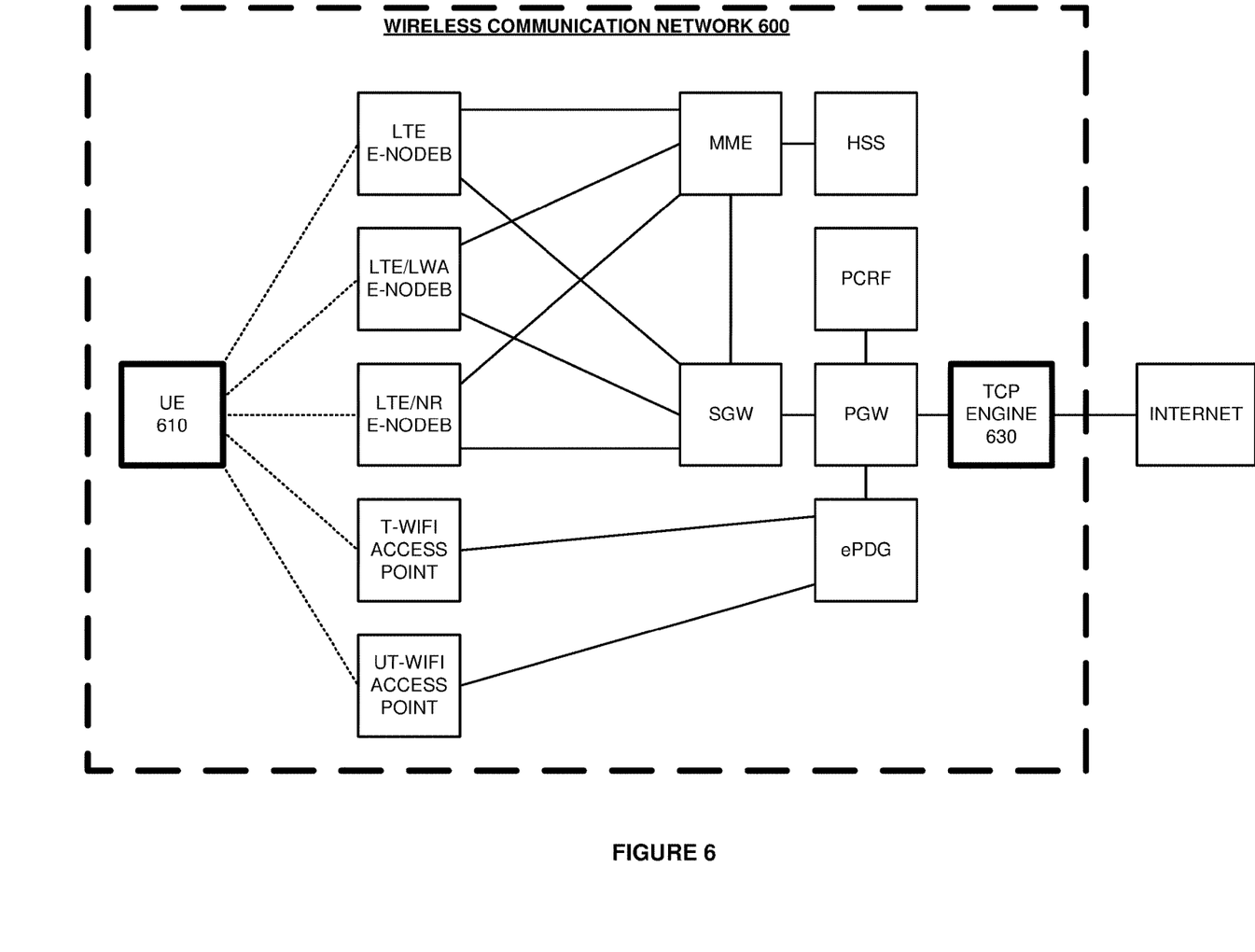
FIG. 6 illustrates a wireless communication network that uses TCP ACKs to identify wireless communication protocols and other Radio Frequency (RF) data for a wireless User Equipment (UE) and to size a TCP buffer and a TCP window in the wireless UE.

FIG. 6 illustrates wireless communication network 600 that uses TCP ACKs to identify wireless communication protocols and other RF data for wireless UE 610 and to size a TCP buffer and a TCP window in wireless UE 610 based on the wireless protocols and RF data. Wireless communication network 600 comprises an example of wireless communication network 100, although network 100 may have alternative configurations and operations. Wireless communication network 600 comprises UE 610 and TCP optimization engine 630. Wireless communication network 600 also comprises Mobility Management Entity (MME), Home Subscriber System (HSS), Serving Gateway (SGW), Packet Data Network Gateway (PGW), Policy Charging Rules Function (PCRF), enhanced Packet Data Gateway (ePDG). The wireless access points of wireless communication network 600 include an LTE eNodeB, LTE/LWA eNodeB, LTE/5G NR eNodeB, T-WIFI access point, and UT-WIFI access point.

Initially, UE 610 attaches to the LTE eNodeB. The LTE eNodeB transfers an initial UE message to the MME which dips the HSS for UE authentication and authorization. The MME sends session set-up signaling to the SGW which signals the PGW. The PGW dips the PCRF to determine session Quality-of-Service (QoS). The PGW selects an IP address for UE 610 and transfers the QoS and IP address to the MME through the SGW. The MME sends session set-up signaling having the IP address and QoS to the LTE eNodeB which wirelessly signals this information to UE 610.

UE 610 wirelessly transmits an IP request to the Internet over the LTE eNodeB, SGW, PGW, and TCP optimization engine 630. TCP optimization engine 630 receives IP packets from the Internet in return. TCP optimization engine 630 encapsulates the IP packets in TCP packets and transfers the TCP/IP packets to UE 610 over the PGW, SGW, and LTE eNodeB. UE 610 receives the TCP/IP packets and loads the TCP/IP data into a TCP/IP buffer. UE 110 generates a TCP ACK for the received TCP/IP packets per its TCP window. The TCP ACK has options field that indicates the current LTE protocol, RF band, wireless signal strength, data rate, and wireless hop count. The RF band comprises an amount of Megahertz (MHZ) spectrum that is centered on a Gigahertz (GHz) frequency. For example, the RF band may comprise a 100 MHz RF channel that is centered at 2.4 GHz. The wireless signal strength is determined by UE 610 for the received wireless signal. Examples of a wireless signal strength measurement include Received Signal Strength Indicator (RSSI) and Channel Quality Index (CQI). The data rate is the speed of TCP/IP packets into UE 610 measured by bits per second. The wireless hop count is the number of wireless links in use when repeaters or relays are used between UE 610 and the wireless access points.

TCP optimization engine 610 selects the TCP buffer size and the TCP window size for UE 610 based on the wireless protocol, RF band, wireless signal strength, data rate, and/or wireless hop count. For example, a large TCP buffer and small TCP window might be selected for a high-bandwidth wireless protocol and RF band. The large TCP buffer and the small window could be decreased for poor wireless signal strength, poor data rate, and/or a high wireless hop count. The large buffer and the small window could be increased for good wireless signal strength, good data rate, and/or low wireless hop count. In another example, a small buffer and large window might be selected for a low-bandwidth wireless protocol and RF band. The small buffer and the large window could be decreased for poor wireless signal strength, poor data rate, and/or a high wireless hop count. The small buffer and the large window could be increased for good wireless signal strength, good data rate, and/or low wireless hop count.

TCP optimization engine 630 generates and transfers a TCP instruction to wireless UE 610 over the PGW, SGW, and LTE eNodeB. UE 610 wirelessly receives the TCP instruction and responsively sizes its TCP buffer to the new TCP buffer size. UE 610 transfers TCP ACKs per the new TCP window size.

UE 110 detaches from the LTE eNodeB and attaches to the co-located LTE/LWA eNodeB using LWA. The MME directs the handover with session modification signaling going to the SGW, PGW, LTE/LWA eNodeB, and UE 610.

UE 610 wirelessly transmits an IP request to the Internet over the LTE/LWA eNodeB, SGW, PGW, and TCP optimization engine 630. TCP optimization engine 630 receives IP packets from the Internet in return. TCP optimization engine 630 encapsulates the IP packets in TCP packets and transfers the TCP/IP packets to UE 610 over the PGW, SGW, and LTE/LWA eNodeB. UE 610 receives the TCP/IP packets and loads the TCP/IP data into the TCP/IP buffer. UE 110 generates a TCP ACK for the received TCP/IP packets per the TCP window. The TCP ACK has an options field that indicates the current LWA protocol, RF band, wireless signal strength, data rate, and wireless hop count.

TCP optimization engine 610 selects a new TCP buffer size and a new TCP window size for UE 610 based on the LWA, RF band, wireless signal strength, data rate, and/or wireless hop count. TCP optimization engine 630 generates and transfers a TCP instruction to wireless UE 610 over the PGW, SGW, and LTE eNodeB. UE 610 wirelessly receives the TCP instruction and responsively sizes its TCP buffer to the new TCP buffer size and transfers TCP ACKs per the new TCP window size.

Due to mobility, UE 110 detaches from the LTE/LWA eNodeB and attaches to the LTE/NR eNodeB using 5G NR. The MME directs the handover with session modification signaling going to the SGW, PGW, LTE/NR eNodeB, and UE 610. UE 610 wirelessly transmits an IP request to the Internet over the LTE/NR eNodeB, SGW, PGW, and TCP optimization engine 630. TCP optimization engine 630 receives IP packets from the Internet in return. TCP optimization engine 630 encapsulates the IP packets in TCP packets and transfers the TCP/IP packets to UE 610 over the PGW, SGW, and LTE/NR eNodeB. UE 610 receives the TCP/IP packets and loads the TCP/IP data into the TCP/IP buffer. UE 110 generates a TCP ACK for the received TCP/IP packets per the TCP window. The TCP ACK has an options field that indicates the current 5G NR protocol, RF band, wireless signal strength, data rate, and wireless hop count.

TCP optimization engine 610 selects a new TCP buffer size and a new TCP window size for UE 610 based on the 5G NR, RF band, wireless signal strength, data rate, and/or wireless hop count. TCP optimization engine 630 generates and transfers a TCP instruction to wireless UE 610 over the PGW, SGW, and LTE eNodeB. UE 610 wirelessly receives the TCP instruction and responsively sizes its TCP buffer to the new TCP buffer size and transfers TCP ACKs per the new TCP window size.

UE 610 then detaches from the LTE/NR eNodeB and attaches to the Trusted WIFI (T-WIFI) access point using T-WIFI. UE 610 registers with the ePDG over the T-WIFI access point. The ePDG transfers an initial UE message to the MME which dips the HSS for UE authentication and authorization. The MME sends session set-up signaling to the ePDG which signals the PGW. The PGW dips the PCRF to determine session Quality-of-Service (QoS). The PGW selects an IP address for UE 610 and transfers the QoS and IP address to the MME. The MME sends session set-up signaling having the IP address and QoS to the ePDG which signals the data to UE 610 of the T-WIFI access point.

UE 610 wirelessly transmits an IP request to the Internet over the T-WIFI access point, ePDG, PGW, and TCP optimization engine 630. TCP optimization engine 630 receives IP packets from the Internet in return. TCP optimization engine 630 encapsulates the IP packets in TCP packets and transfers the TCP/IP packets to UE 610 over the PGW, ePDG, and T-WIFI access point. UE 610 receives the TCP/IP packets and loads the TCP/IP data into a TCP/IP buffer. UE 610 generates a TCP ACK for the received TCP/IP packets per the TCP window. The TCP ACK has options field that indicates the current T-WIFI/ePDG protocol, RF band, wireless signal strength, data rate, and wireless hop count.

TCP optimization engine 610 selects the TCP buffer size and the TCP window size for UE 610 based on the T-WIFI/ePDG, RF band, wireless signal strength, data rate, and/or wireless hop count. TCP optimization engine 630 generates and transfers a TCP instruction to wireless UE 610 over the PGW, ePDG, and T-WIFI access point. UE 610 wirelessly receives the TCP instruction and responsively sizes its TCP buffer to the new TCP buffer size and transfers TCP ACKs per the new TCP window size.

Due to mobility, UE 610 detaches from the T-WIFI access point and attaches to the Untrusted WIFI (UT-WIFI) access point using UT-WIFI. UE 610 registers with the ePDG over the UT-WIFI access point. The ePDG transfers an initial UE message to the MME which dips the HSS for UE authentication and authorization. The MME sends session set-up signaling to the ePDG which signals the PGW. The PGW dips the PCRF to determine session QoS. The PGW selects an IP address for UE 610 and transfers the QoS and IP address to the MME. The MME sends session set-up signaling having the IP address and QoS to the ePDG which signals the data to UE 610 over the UT-WIFI access point.

UE 610 wirelessly transmits an IP request to the Internet over the UT-WIFI access point, ePDG, PGW, and TCP optimization engine 630. TCP optimization engine 630 receives IP packets from the Internet in return. TCP optimization engine 630 encapsulates the IP packets in TCP packets and transfers the TCP/IP packets to UE 610 over the PGW, ePDG, and UT-WIFI access point. UE 610 receives the TCP/IP packets and loads the TCP/IP data into the TCP/IP buffer. UE 610 generates a TCP ACK for the received TCP/IP packets per the TCP window. The TCP ACK has an options field that indicates the current UT-WIFI/ePDG protocol, RF band, wireless signal strength, data rate, and wireless hop count.

TCP optimization engine 610 selects the TCP buffer size and the TCP window size for UE 610 based on the UT-WIFI/ePDG, RF band, wireless signal strength, data rate, and/or wireless hop count. TCP optimization engine 630 generates and transfers a TCP instruction to wireless UE 610 over the PGW, ePDG, and UT-WIFI access point. UE 610 wirelessly receives the TCP instruction and responsively sizes its TCP buffer to the new TCP buffer size and transfers TCP ACKs per the new TCP window size.

Figure 7:
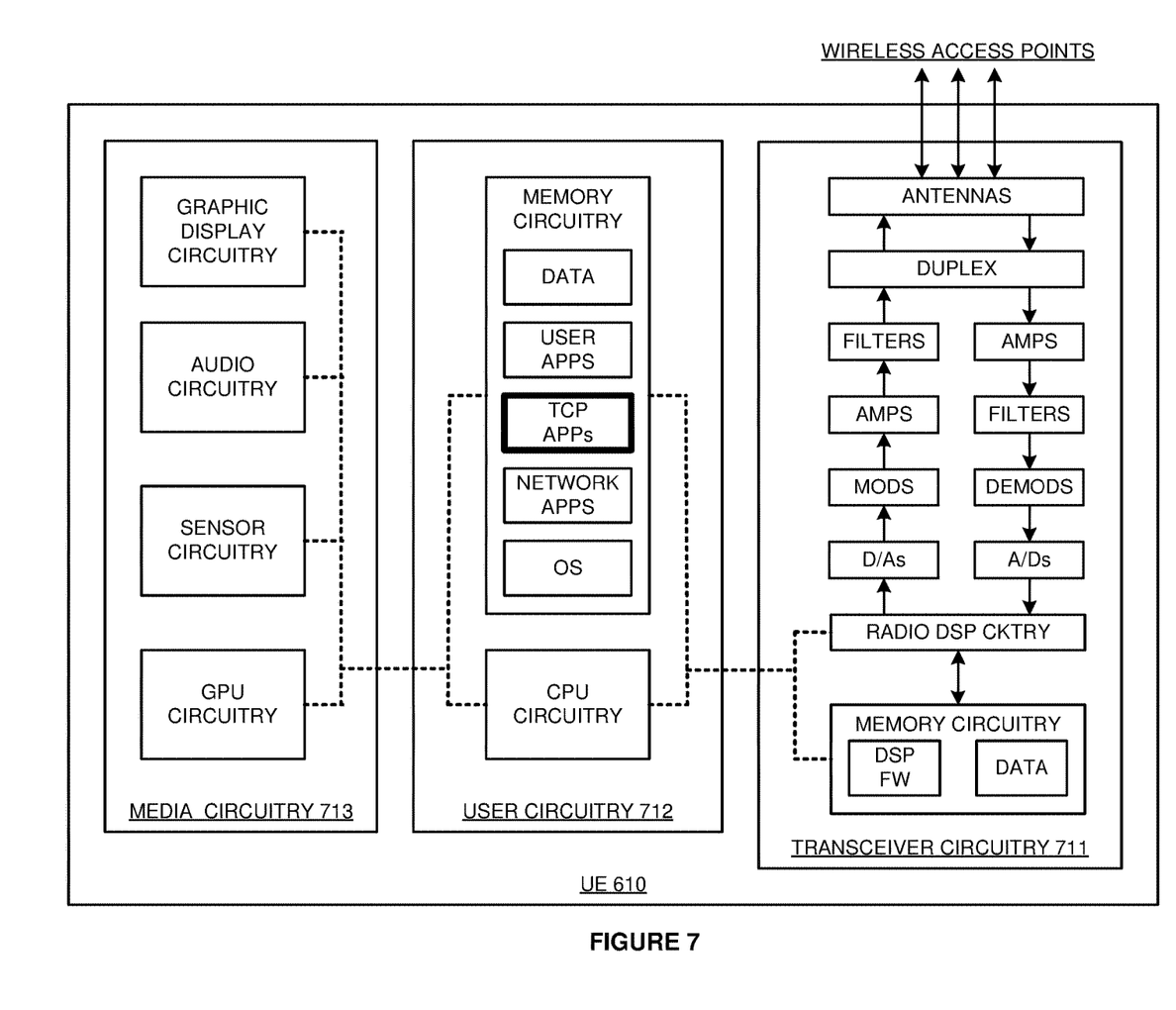
FIG. 7 illustrates the wireless UE that transmits TCP ACKs to identify wireless communication protocols and other RF data and that sizes a TCP buffer and a TCP window responsive to TCP instructions.

FIG. 7 illustrates UE 610. UE 610 comprises transceiver circuitry 711, user circuitry 712, and media circuitry 713. In UE 610, transceiver circuitry 711, user circuitry 712, and media circuitry 713 are coupled by data buses and links that are indicated by dotted lines. Transceiver circuitry 711 comprises antennas, duplexers, modulators, filters, amplifiers (AMPS), Analog-to-Digital converters (A/Ds), Digital-to-Analog converters (D/As), radio Digital Signal Processing (DSP) circuitry, and memory. The memory stores data and DSP firmware (FW). In transceiver circuitry 711, the radio DSP circuitry executes the DSP FW to drive the wireless exchange of the data with the wireless access points.

User circuitry 712 comprises CPU circuitry and memory. The memory stores data, operating system software (OS), network application software (APPs), TCP APPs, user APPs, and data. The CPU circuitry executes the operating system and network applications to control the exchange of the data with the wireless access points. The CPU circuitry executes the operating system and the user applications, like a media streaming application, to serve the user. The CPU circuitry executes the operating system and the TCP applications to size TCP buffers and windows, load TCP/IP packets into the TCP buffers, and generate TCP ACKs for the TCP/IP packets per the TCP window. The network applications comprise physical (PHY) modules, Media Access Control (MAC) modules, IP module modules, Radio Resource Control (RRC) modules, Packet Data Convergence Protocol (PDCP) modules, and Radio Link Control (RLC) modules.

Media circuitry 713 comprises user interface hardware like graphic display circuitry, audio circuitry, sensor circuitry, and GPU circuitry In operation, the antennas in transceiver circuitry 711 receive wireless signals and transfer corresponding electrical signals through the duplexers to the amplifiers. The amplifiers boost the signals for the filters which attenuate out-of-band energy. A demodulator down converts the amplified and filtered signal from the carrier frequency. An A/D converts the demodulated analog signal into a digital signal for the radio DSP circuitry. The radio DSP circuitry recovers data from the digital signal and transfers the recovered data to the memory. The data mainly comprises user data but also includes TCP instructions. The CPU circuitry executes the OS to process the received data through the network applications and the TCP applications as described herein. The TCP applications size TCP windows and TCP buffers responsive to TCP instructions. Advantageously, the TCP applications generate TCP ACKs that indicate the current wireless protocol and other RF data for delivery to a TCP optimization engine.

To transmit user data, the radio DSP circuitry transfers digital transmit signals having user data to the D/As which transfer corresponding analog transmit signals to the modulators. The modulators upconvert the user data to the specified frequencies and transfer the RF signals to the amplifiers for power gain. The amplifiers transfer the high-power RF signals through band-pass filters for the carrier frequencies and then through the duplexers to the antennas. The RF signals drive the antennas to emit wireless signals to the wireless access points having the user data.

Figure 8:
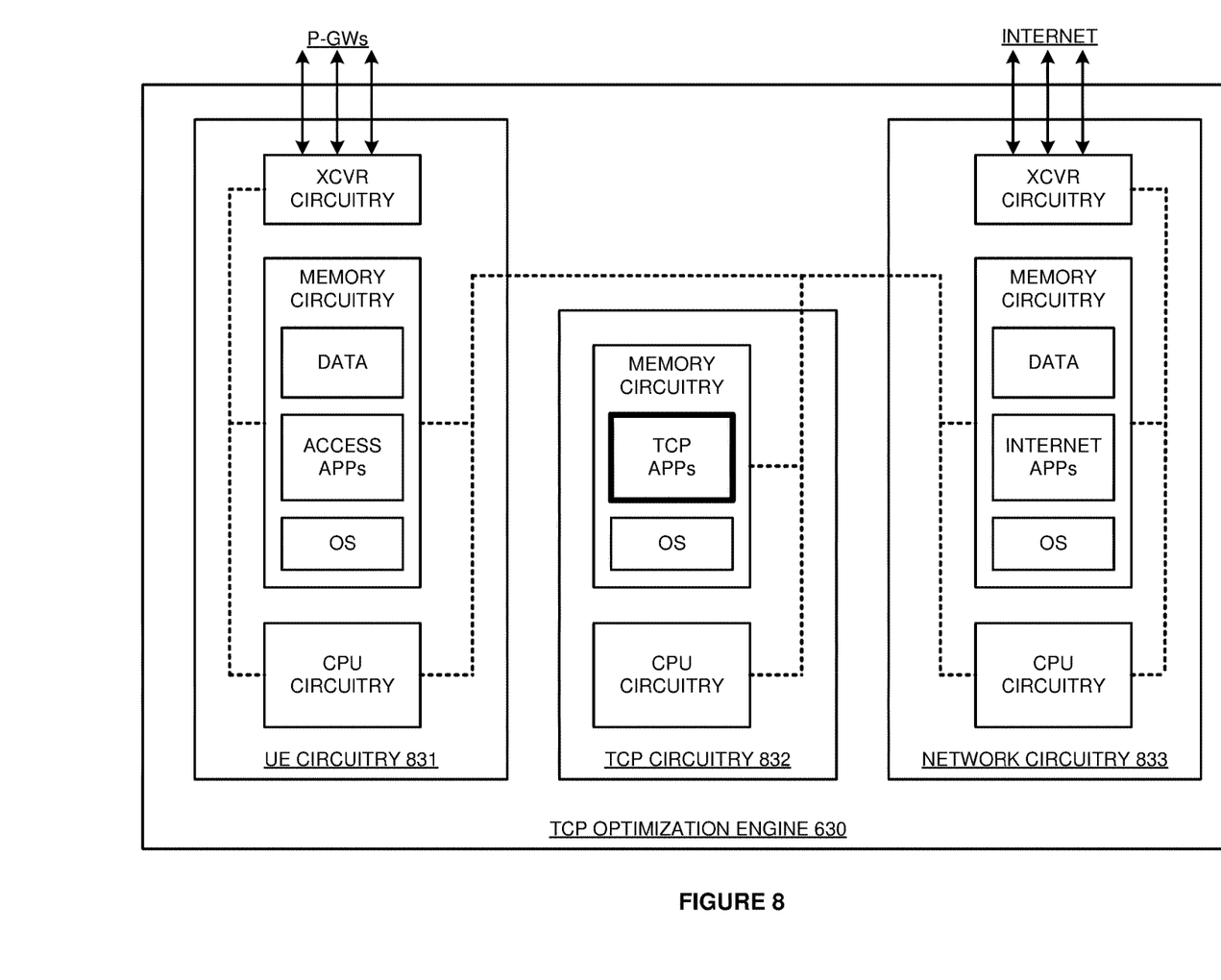
FIG. 8 illustrates a TCP optimization engine that processes TCP ACKs to identify wireless communication protocols and other RF data for wireless UEs and that sizes TCP buffers and TCP windows in the wireless UEs based on the wireless communication protocols and other RF data.

FIG. 8 illustrates TCP optimization engine 630. TCP optimization engine 630 comprises UE circuitry 831, TCP circuitry 832, and network circuitry 833. In TCP optimization engine 630, network circuitry 833, TCP circuitry 832, and user circuitry 831 are coupled by data buses and links that are indicated by dotted lines.

User circuitry 831 comprises transceiver (XCVR) circuitry, CPU circuitry, and memory circuitry. The memory circuitry stores operating system software, access network applications, and data. The transceiver circuitry comprises data ports, DSP circuitry, and memory that stores data and DSP firmware/software. The CPU circuitry executes the OS and access network applications to drive the transceiver circuitry to exchange TCP/IP packets with UEs over various access points through one or more P-GWs.

TCP circuitry 832 comprises CPU circuitry and memory circuitry. The memory stores operating system software and TCP application software. The CPU circuitry executes the operating system and TCP applications to optimize IP traffic for network 600 and UE 610. The TCP applications size TCP buffers and the TCP windows for UE 610 based on the current wireless protocol and other RF data. The TCP applications generate and transfer TCP instructions to UE 610 indicating the new TCP buffer and window sizes.

Network circuitry 833 comprises transceiver circuitry, CPU circuitry, and memory circuitry. The memory circuitry stores operating system software, internet applications, and data. The transceiver circuitry comprises data ports, DSP circuitry, and memory that stores data and DSP firmware/software. The CPU circuitry executes the OS and internet applications to drive the transceiver circuitry to exchange IP packets with remote servers over the Internet.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network, the method comprising:
   a Transmission Control Protocol (TCP) optimization engine receiving user data and responsively transferring a TCP packet having the user data for delivery to a wireless User Equipment (UE);
   the wireless UE wirelessly receiving the TCP packet with a wireless signal strength using a wireless communication protocol and loading the TCP packet into a TCP buffer;
   in response to receiving the TCP packet with the wireless signal strength, the wireless UE generating a TCP Acknowledgment (ACK) that indicates the wireless signal strength and the wireless communication protocol and wirelessly transferring the TCP ACK for delivery to the TCP optimization engine;
   the TCP optimization engine receiving the TCP ACK and responsively selecting a TCP buffer size for the TCP buffer based on the wireless signal strength and the wireless communication protocol and generating and transferring a TCP buffer instruction for delivery to the wireless UE; and
   the wireless UE wirelessly receiving the TCP buffer instruction and responsively sizing the TCP buffer to the TCP buffer size.

2. The method of claim 1 wherein the wireless communication protocol comprises Long Term Evolution (LTE).

3. The method of claim 1 wherein the wireless communication protocol comprises Wireless Fidelity (WIFI).

4. The method of claim 1 wherein the wireless communication protocol comprises Long Term Evolution Wireless Local Area Network Aggregation (LWA).

5. The method of claim 1 wherein the wireless communication protocol comprises New Radio (NR).

6. The method of claim 1 wherein the wireless communication protocol comprises Wireless Fidelity through enhanced High Rate Packet Data (WIFI-eHRPD).

7. The method of claim 1 wherein:
   the wireless UE wirelessly receiving the TCP packet comprises wirelessly receiving the TCP packet over a Radio Frequency (RF) band;
   the wireless UE generating the TCP ACK comprises generating the TCP ACK that indicates the RF band; and
   the TCP optimization engine selecting the TCP buffer size comprises selecting the TCP buffer size based on the RF band.

8. The method of claim 1 wherein:
the wireless UE wirelessly receiving the TCP packet comprises wirelessly receiving the TCP packet at a data rate;
the wireless UE generating the TCP ACK comprises generating the TCP ACK to indicate the data rate; and
the TCP optimization engine selecting the TCP buffer size comprises selecting the TCP buffer size based on the data rate.

9. The method of claim 1 further comprising:
the wireless UE processing the TCP packet with a TCP window;
the TCP optimization engine selecting a TCP window size for the TCP window based on the wireless communication protocol, wherein the TCP optimization engine generating and transferring the TCP instruction comprises generating and transferring the TCP instruction to indicate the TCP window size; and
the wireless UE sizing the TCP window to the TCP window size responsive to the TCP instruction.

10. A wireless communication network comprising:
a Transmission Control Protocol (TCP) optimization engine configured to receive user data and responsively transfer a TCP packet having the user data for delivery to a wireless User Equipment (UE);
the wireless UE configured to wirelessly receive the TCP packet with a wireless signal strength using a wireless communication protocol and load the TCP packet into a TCP buffer;
in response to receiving the TCP packet with the wireless signal strength, the wireless UE configured to generate a TCP Acknowledgment (ACK) that indicates the wireless signal strength and the wireless communication protocol and to wirelessly transfer the TCP ACK for delivery to the TCP optimization engine;
the TCP optimization engine configured to receive the TCP ACK and responsively select a TCP buffer size for the TCP buffer based on the wireless signal strength and the wireless communication protocol and to generate and transfer a TCP buffer instruction for delivery to the wireless UE; and
the wireless UE configured to wirelessly receive the TCP buffer instruction and responsively size the TCP buffer to the TCP buffer size.

11. The wireless communication network of claim 10 wherein the wireless communication protocol comprises Long Term Evolution (LTE).

12. The wireless communication network of claim 10 wherein the wireless communication protocol comprises Wireless Fidelity (WIFI).

13. The wireless communication network of claim 10 wherein the wireless communication protocol comprises Long Term Evolution Wireless Local Area Network Aggregation (LWA).

14. The wireless communication network of claim 10 wherein the wireless communication protocol comprises New Radio (NR).

15. The wireless communication network of claim 10 wherein the wireless communication protocol comprises Wireless Fidelity through enhanced High Rate Packet Data (WIFI-eHRPD).

16. The wireless communication network of claim 10 wherein:
the wireless UE is configured to wirelessly receive the TCP packet over a Radio Frequency (RF) band;
the wireless UE is configured to generate the TCP ACK indicating the RF band; and
the TCP optimization engine is configured to select the TCP buffer size based on the RF band.

17. The wireless communication network of claim 10 wherein:
the wireless UE is configured to wirelessly receive the TCP packet at a data rate;
the wireless UE is configured to generate the TCP ACK indicating the data rate; and
the TCP optimization engine is configured to select the TCP buffer size based on the data rate.

18. The wireless communication network of claim 10 further comprising:
the wireless UE is configured to process the TCP packet with a TCP window;
the TCP optimization engine is configured to select a TCP window size for the TCP window based on the wireless communication protocol, wherein the TCP optimization engine is configured to generate and transfer the TCP instruction indicating the TCP window size; and
the wireless UE is configured to size the TCP window to the TCP window size responsive to the TCP instruction.

* * * * *